United States Patent [19]

Nishimura et al.

[11] 4,270,625

[45] Jun. 2, 1981

[54] ENGINE MOUNT FOR A VEHICLE

[75] Inventors: Yutaka Nishimura; Kazuyuki Gamano, both of Okazaki, Japan

[73] Assignee: Toyota Jidosha Kogyo Kabushiki Kaisha, Toyota, Japan

[21] Appl. No.: 50,560

[22] Filed: Jun. 21, 1979

[30] Foreign Application Priority Data

Mar. 12, 1979 [JP] Japan .............................. 54-30354[U]

[51] Int. Cl.$^3$ .............................................. B60L 5/02
[52] U.S. Cl. .................................... 180/291; 248/638
[58] Field of Search ...................... 180/70 P, 291, 292; 248/638, 659

[56] References Cited

U.S. PATENT DOCUMENTS

| 2,022,111 | 11/1935 | Evans | 180/292 |
| 2,660,387 | 11/1953 | Roy | 248/638 X |
| 3,236,326 | 2/1966 | Reynolds | 180/292 |
| 3,998,290 | 12/1976 | Sivers et al. | 180/292 X |
| 4,081,197 | 3/1978 | Ackel | 180/70 P X |

Primary Examiner—John J. Love
Assistant Examiner—Donald W. Underwood
Attorney, Agent, or Firm—Stevens, Davis, Miller & Mosher

[57] ABSTRACT

A device for mounting a rear extension portion of an engine to a support member of a vehicle body. The device has an upper support plate and a lower support plate which are connected with each other by elastic side members made of a rubber material. The upper support plate has a stopper rod having an upper end fixedly connected thereto. The lower end of the rod is freely passed through a tubular rubber member mounted to a center opening of the lower support plate. An inner edge of the opening located in the tubular rubber member has an upwardly directed lip portion.

1 Claim, 6 Drawing Figures

ENGINE MOUNT FOR A VEHICLE

DESCRIPTION OF THE INVENTION

The present invention relates to an engine mount for supporting a longitudinally extending rear extension portion of an engine body to a transversely extending rear cross member of a vehicle body. The present invention is intended to increase labor efficiency during the assembly of a motor vehicle.

A rear end portion of an engine for a vehicle is generally mounted to the body of the vehicle by way of an extension housing extending from the casing of a transmission device. In order to prevent the vibration of the engine from being transmitted to the vehicle body, an elastic means acting as a damper device is arranged between an upper support plate fixedly connected to the extension housing and a lower support plate fixedly connected to the body. The elastic means allows the engine to move vertically or horizontally with respect to the body of the vehicle against a spring force of the elastic means, so that the vibration of the engine transmitted to the body is effectively decreased. However, if the displacement between the engine and the body is large, the elastic means of the rubber material will be easily damaged. Thus, a stopper mechanism is necessary for allowing only a limited displacement between the engine and the body.

In the prior art, the stopper mechanism is comprised of a stopper rod fixedly connected to the upper plate and a tubular elastic member made of a rubber material through which the stopper rod freely passes. The stopper rod has on its lower end thereof a flange portion. The flange portion should be connected to the rod after the tubular rubber material is formed, in order to allow the separation of a pair of moulds for vulcanizing the rubber material. In order to prevent any thermal damage of the rubber material, arc welding can not be utilized to connect the flange portion to the rod. Therefore, in the prior art, a connection means which does not provide any heat, such as calking, which is costly when compared with arc welding, is utilized. Thus, the prior art suffers from such a drawback that assembling of the mount device requires extra labor costs.

An object of the present invention is to provide a device for mounting the rear portion of the engine to a body of the vehicle. The device should have a simple construction which is economical to produce.

Another object of the present invention is to provide a device for mounting the rear portion of the engine to the body of the vehicle, capable of effectively decreasing the vibration of the engine transmitted to the body.

According to the present invention, a device for mounting a longitudinally extending rear extension portion of an engine to a transversely extending rear support member of a vehicle body is provided, which device comprises: a transversely extending first plate member arranged along the lower surface of the rear extension portion, the first plate member being fixedly connected to the rear extension portion; a transversely extending second plate member arranged below the first plate member, the second plate member being provided with means for fixedly connecting the second plate member to the rear support member, the second plate member defining at the center thereof an opening; a pair of first elastic members arranged on each side of the opening for elastically connecting the first plate member to the second plate member; a second elastic member of a substantially tubular shape, in which an inner edge of the opening of the second plate member is located, the upper surface of the second elastic member being spaced from the lower surface of the first plate member; and a stopper rod which is on the upper end thereof fixedly connected to the first plate member, the stopper rod being projected out of the second elastic member.

An embodiment of the present invention will now be explained with reference to the attached drawings in which.

DESCRIPTION OF A PREFERRED EMBODIMENT

Figure 1:
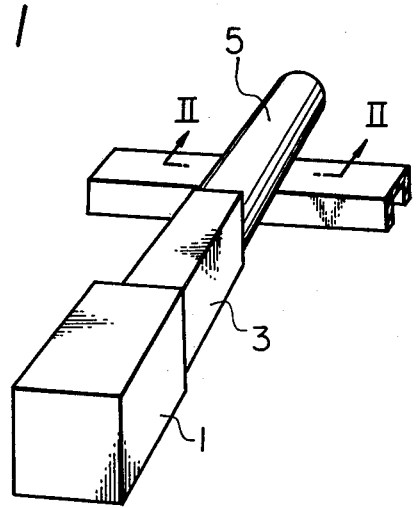
FIG. 1 is a perspective and schematic view of an engine and a rear support member of a vehicle body.

Referring to FIG. 1 in which an engine rear structure is schematically illustrated, reference numeral 1 designates a body of the engine. The engine has at the rear portion thereof a longitudinally extending extension housing 5 which is connected to the engine body by way of a transmission case 3. The extension housing 5 is connected, by a device (or an engine mount) which will be fully described later, to a rear support member 7 of a vehicle extending transversely with respect to the extension housing 5.

Figure 2:
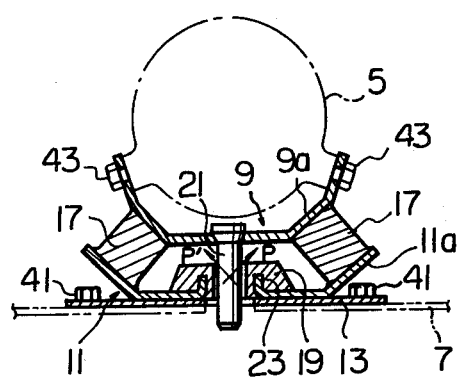
FIG. 2 is a cross-sectional view of an engine mount according to the present invention, taken along the line II—II in FIG. 1.

In FIG. 2 indicating the engine mount according to the present invention, reference numeral 9 designates an upper support plate which extends transversely with respect to the axis of the extension housing 5. The plate 9, which is adapted to be connected to the extension housing 5, has on both sides thereof upwardly bent portions 9a for arranging the plate 9 substantially along the lower surface of the extension housing 5. Arranged below the upper plate 9 is a lower support plate 11 which also extends transversely to the axis of the extension housing 5. The lower plate 11 is, in the embodiment shown in FIG. 2, connected to the rear support member 7 by means of a flat plate member 13 welded to the lower support plate 11. As shown in FIG. 2, the lower plate 11 has upwardly bent side portions 11a. A pair of first elastic members 17 made of a rubber material are arranged between the upper and the lower support plates 9 and 11. Each of the elastic members 17 is, on the upper or lower end thereof, fixedly connected to the corresponding side portion 9a of the upper plate 9 or the corresponding side portion 11a of the lower plate 11, as will be described later.

Figure 3:
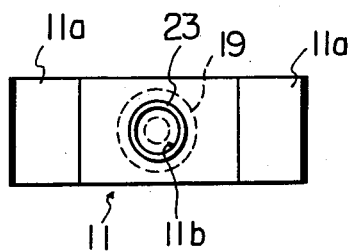
FIG. 3 is an upper elevational view of the lower support plate of the engine mount in FIG. 2.

The lower support plate 11 has, at the center thereof, an opening 11b (FIG. 3). A second elastic member 19 made of the rubber material is fixedly attached to the plate 11 so that an inner edge portion of the opening 11b is located in the second elastic member 19. The member 19 has an upper flat surface which is separated from the lower surface of the support plate 9. When the movement of the upper plate 9 toward the lower plate 11 against the elastic force of the first elastic member 17 is large, the upper plate 9 becomes engaged with the second elastic member 19, for stopping the housing 5 from moving further. A stopper rod 21, which is adapted for limiting a horizontal movement of the extension housing 5, is, on the upper end thereof, fixedly connected to the upper support plate 9. The other end of the rod 21 is passed through the tubular elastic element 19 without normally touching the element 19, and slightly projects out of the rear support member 7 from below. The inner edge portion of the central opening 11b of the lower support member 11 is formed by an upwardly directed tubular projection or a lip portion 23.

Figure 4A:
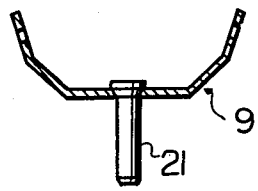
FIGS. 4a and 4b show parts constructing the engine mount of FIG. 2, during assembling thereof.
Figure 4B:
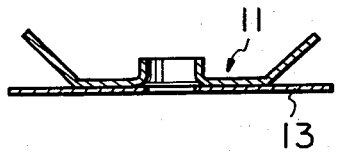
Figure 5:
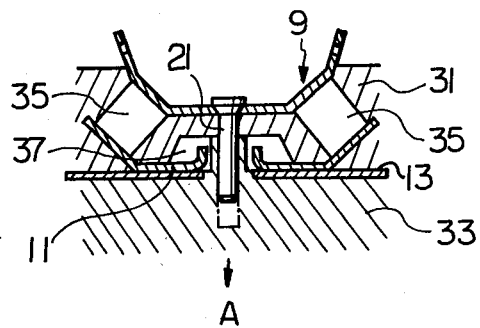
FIG. 5 shows a mold device for producing the rubber elastic members in FIG. 2.

Assembling of the parts of the engine mount according to the present invention is now described. Firstly, the upper end of the stopper rod 21 is connected to the upper support member 9 by using arc welding as shown in FIG. 4a. The flat plate 13 is also connected to the lower support member 11 by using arc welding as shown in FIG. 4b. Then, the upper support plate 9 for fixing the stopper rod 21 and the lower plate 11 for fixing the flat plate 13 are arranged in a mold device for molding an elastic material (rubber) comprising a first portion(s) 31, 31 and a second portion 33. Spaces 35 corresponding to the first elastic member 17 and spaces 37 corresponding to the second elastic member 19 are formed between the portions 31 and 33. The rubber material is introduced into the spaces 35 and 37 to fill the spaces 35 and 37. Next, the mold is heated in order to vulcanize the rubber material therein. Thus, the elastic rubber material is fixedly attached to the upper support plate 9 or the lower support plate 11. Then, these mold portions 31 and 33 are separated from each other, so that the engine mount as shown in FIG. 1 is obtained. The separation of the mold portion 33 is easily effected by moving the portion 33 away from the mold portion 31 as shown by an arrow A in FIG. 5, since no flange portion for preventing such motion is formed on the stopper rod 21.

A stopper rod having a flange portion on its lower end thereof is used in the prior art. Thus, when the stopper plate with the flange portion is fixedly connected to the upper support plate in advance, the separation of one of the molds from the other mold after the rubber material is vulcanized becomes impossible due to the fact that the flange portion is engaged with the mold. Thus, the stopper rod should be fixedly connected to the upper support plate after vulcanization is effected. However, arc welding after vulcanization causes the rubber material for constructing the elastic elements to be damaged. Therefore, the stopper rod should be connected to the upper support plate by using a mechanical means such as calking, which decreases the production efficiency when the engine mount is manufactured.

As is clear from the above description, the present invention make it possible to increase the production efficiency of the engine when compared with the prior art.

The engine mount thus obtained according to the present invention is arranged in a vehicle as shown in FIG. 2. The engine mount is fixedly connected to the vehicle body by using bolt or nut members 41 adapted for connecting the plate 13, to which the lower support plate 11 is fixedly secured, to the rear support member 7 of the vehicle body. The rear portion of the engine is mounted on the engine mount by using bolt or nut members 43 adapted for fixedly connecting the extension housing 5 of the engine to the upper support plate 9 of the engine mount.

During the use of the engine mount according to the present invention, the elastic members 17 prevent the vibration of the engine from being directly transmitted to the vehicle, since a small displacement between the extension housing 5 and the rear support member 7 is, against the elastic force caused by the rubber members 17, allowed due to the fact that the stopper rod 21 can pass freely through the tubular elastic element 19. A large displacement of the extension housing 5 in the horizontal direction is prevented from occurring since the stopper rod is engaged with the tubular elastic material. A large upwardly directed displacement formed between the housing 5 and the rear support member 7 takes place mainly along the direction, as shown by the arrow P or P' in FIG. 2, which forms a small angle with respect to the axis of the stopper rod 21. This large displacement as shown by the arrow P does not cause the stopper rod 21 to be withdrawn from the tubular elastic member 19, since the upwardly directed lip portion 23 is located in the element to engage with the rod 21 so as to be stopped from moving further. The lip portion 23 also serves to reinforce the tubular rubber element 19, when the upper plate 9 is moved downwardly over a great distance so as to become engaged with the element. As a result, an excessive deformation of the elastic members does not take place, thus preventing the member 19 from being damaged.

While the present invention is explained hereinabove with reference to the accompanying drawings, many modifications and changes may be effected by those skilled in this art.

What is claimed is:

1. A device for mounting a longitudinally extending rear extension portion of an engine to a transversely extending rear support member of a vehicle body, said device comprising:

a transversely extending first plate member arranged along the lower surface of said rear extension portion, said first plate member being fixedly connected to said rear extension portion, a transversely extending second plate member arranged below said first plate member, said second plate member being provided with means for fixedly connecting said second plate member to said rear support member, said second plate member defining at the center thereof an opening, a pair of first elastic members arranged on each side of said opening for elastically connecting said first plate member to said second plate member, a second elastic member of a substantially tubular shape, in which an inner edge of said opening of said second plate member is located, the upper surface of said second elastic member being spaced from the lower surface of said first plate member, and a stopper rod which is on the upper end thereof fixedly connected to said first plate member, said stopper rod having a straight longitudinally extending bottom end extended out from said second elastic member, said inner edge of said opening which is located in said second elastic member having an upwardly directed lip portion.

* * * * *